F. ZIEMER AND C. BRAUN.
ASH SIFTER.
APPLICATION FILED MAY 15, 1919.

1,333,236.

Patented Mar. 9, 1920.
2 SHEETS—SHEET 1.

Inventor
FREDERICK ZIEMER.
CHARLES BRAUN
By C. A. Snow & Co.
Attorneys

Witness

F. ZIEMER AND C. BRAUN.
ASH SIFTER.
APPLICATION FILED MAY 15, 1919.

1,333,236.

Patented Mar. 9, 1920.
2 SHEETS—SHEET 2.

Inventor
FREDERICK ZIEMER.
CHARLES BRAUN.

Witness

By

Attorneys

UNITED STATES PATENT OFFICE.

FREDRICK ZIEMER, OF FREEPORT, AND CHARLES BRAUN, OF BROOKLYN, NEW YORK.

ASH-SIFTER.

1,333,236.      Specification of Letters Patent.      Patented Mar. 9, 1920.

Application filed May 15, 1919. Serial No. 297,377.

*To all whom it may concern:*

Be it known that we, FREDRICK ZIEMER and CHARLES BRAUN, citizens of the United States, residing, respectively, at Freeport and Brooklyn, in the counties of Nassau and Kings, State of New York, have invented a new and useful Ash - Sifter, of which the following is a specification.

The present invention relates to ash sifters, the object being to provide an ash sifter which will prevent dust from escaping from the same to be inhaled by the operator while the ashes are being sifted.

A further object of the invention is to provide an ash sifter which embodies a chamber for receiving the ashes containing the dust and the partly burnt coals, and a second chamber for catching the worthless clinkers and dust, the latter being readily removed from the sifter in receptacles that are provided for each chamber.

Another object of the invention is to provide a manually operable ash sifter which may be operated with a minimum expenditure of energy, and which will not tire the person as does the ordinary sifter.

An additional object is to provide a sifter having the above characteristics which is simple in construction, which consists of few parts, and which may be manufactured and sold at a minimum cost.

With the above and other objects and advantages in view the invention consists of combinations of elements, arrangements and constructions, and details to be hereinafter more fully set forth.

Figure 2:
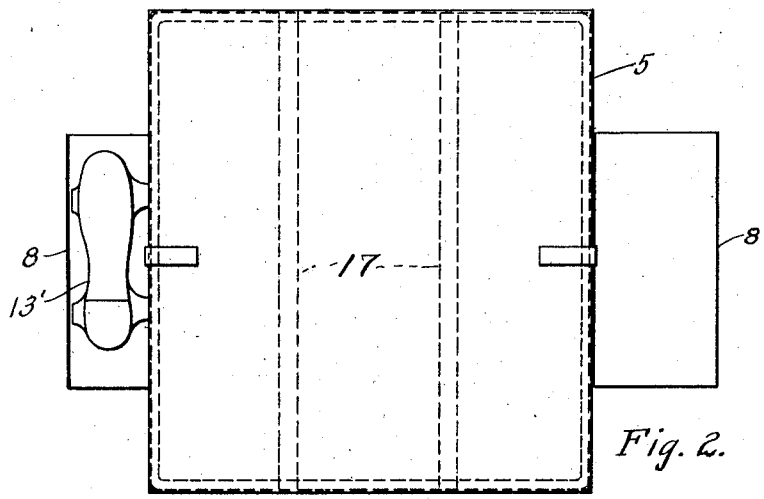
Figure 1:
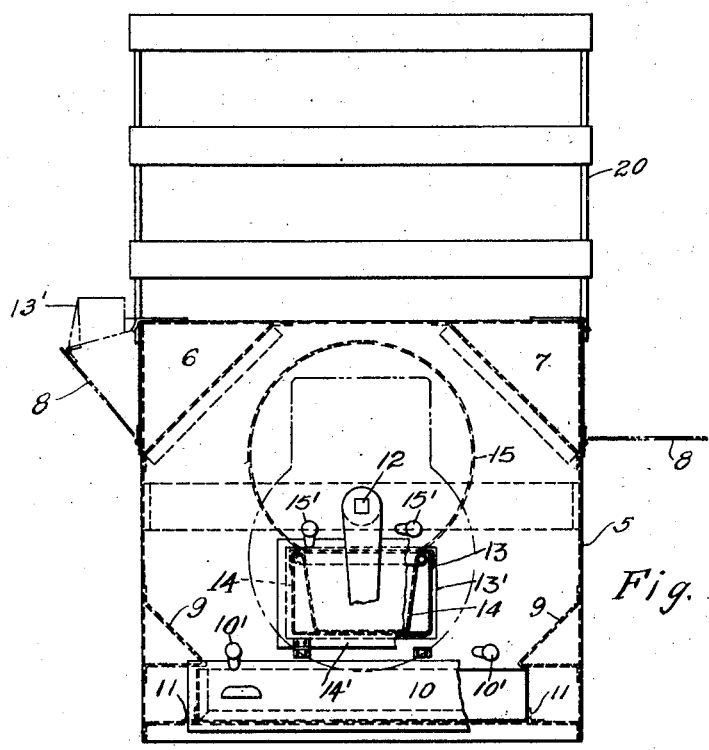
Figure 3:
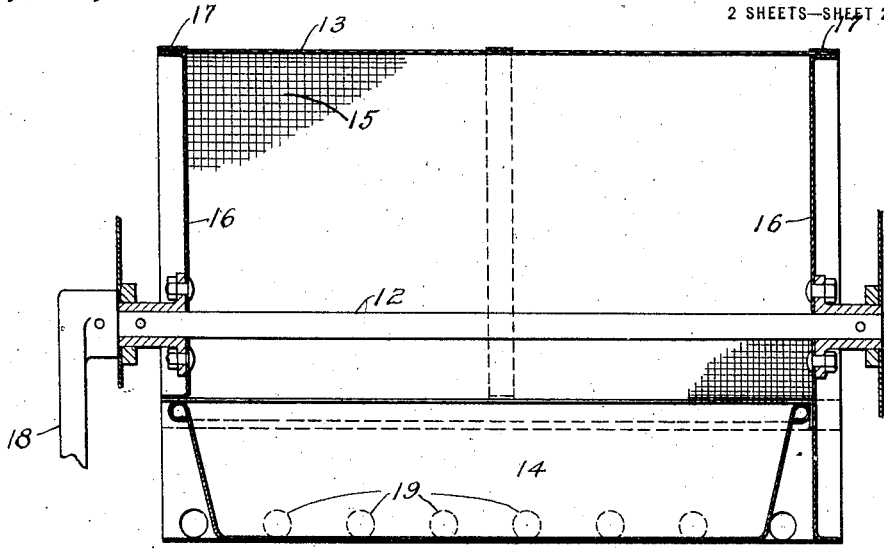
Figure 4:
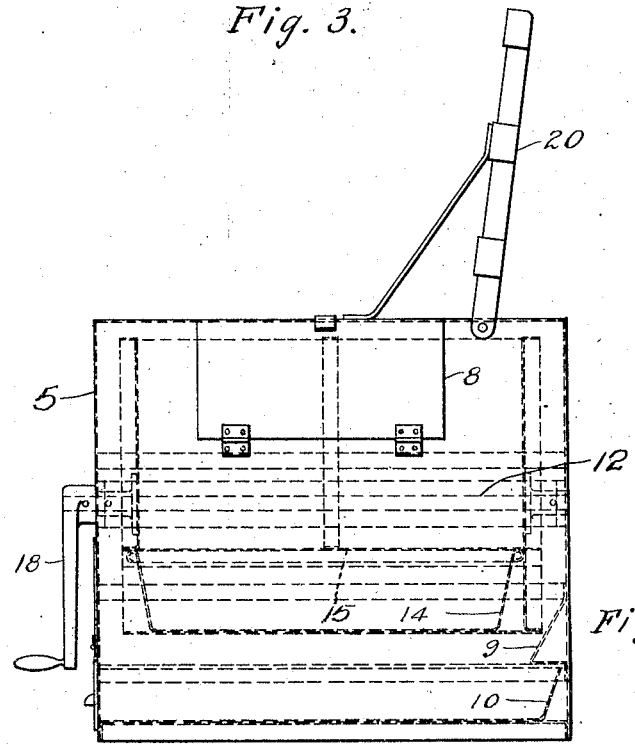

In the drawings, Figure 1 is a front elevation of the sieve; Fig. 2 is a top elevation of the same; Fig. 3 is a side elevation of the bowed sheet and parts carried thereby in supported position, parts of the walls of the casing being shown in section; Fig. 4 is an elevation taken at right-angles from Fig. 1.

Referring to the details of the drawings, numeral 5 denotes a rectangular casing which is formed of any desirable metal and which has chambers 6 and 7 formed at its upper end which are adapted to contain any desired articles. Doors 8 are provided in the casing whereby access may be had to these chambers. Extending longitudinally of the casing 5 at the bottom thereof at one end are deflecting members 9 which are arranged in divergent relation with respect to each other and are adapted to guide or deflect the ashes et cetera into a removable drawer or pan 10 which is mounted in a guide 11 at the bottom of this casing 5.

The shaft 12 is journaled in the end of the casing 5. Adapted to rotate with the shaft 12 in the casing 5 is a rectangular guide 13 in which is movably mounted an ash pan 14. The upper side of the guide 13 is open and has a sheet of reticulated material 15 secured thereto which is transversely bowed. End plates 16 are secured to the bowed sheet 15 and are fixed to rotate with the shaft 12. A plurality of spaced parallel bars 17 have their ends secured to the end plates 16 and support the bowed sheet 15. A handle 18 is secured to the outer end of the shaft 12 by means of which the shaft and parts attached thereto are rotated. Openings 19 are formed in the longitudinal edges of the rectangular guide so that the dust will escape therefrom while the ashes are being sifted.

A foot rest 13' is mounted upon the door of one of the compartments 6 and 7. Catches 10' are provided on the front of the casing to engage the pan 10 so as to hold the latter in position. The casing is also provided with an opening 13' in the front thereof closed by a hinged door 14', which is held by catches 15'; also carried by the front of the casing and engaging said door. By this means, the pan 14 may be filled with cinders and after the same have been sifted, the pan can be removed and the coals emptied therefrom.

A back rest 20 is mounted upon the upper side of the casing so that the casing may be used as a chair when the ash sifter is not in use. In the use of the device the handle 18 is rotated far enough to bring the pan 14 to the upper end of the casing 5 and directly over the pan 10. By rotating the handle 18 back and forth, the ashes are sifted through the bowed sheet 15 and are guided to the pan 10 by the plates 9. After the ashes have been sifted in this manner the handle 18 is then rotated to its original position, the coals caught in the bowed sheet 13 dropping back into the pan 14.

The embodiment of the invention herein shown and described is considered the preferred construction but it should be understood that the same may be modified in many respects, and that our limits of modification are only governed by the appended claims.

What is claimed is:

1. In an ash sifter, a casing, a shaft rotatable in the casing, a removable pan rotatable with the casing and having one side thereof open, a sheet of reticulated material covering the open side of the pan, a second pan at the bottom of the casing, the first-mentioned pan being adapted to be disposed above the pan in the bottom of the casing with its opened side down and projecting from the covering of reticulated material, and a handle for rotating the shaft back and forth to sift the ashes.

2. In an ash sifter, a casing, a shaft rotatable in the casing, a rectangular guide rotatable with the shaft and having its upper side open and openings formed in the longitudinal edges thereof, a sheet of reticulated material secured to the edges of the guide and being transversely bowed, end plates secured to the ends of the bowed sheet and closing said ends, a pan removably mounted in the guide substantially outwardly of the arc of said sheet, a second pan mounted in the bottom of the casing, and means for rocking the first-mentioned pan at the top of the casing to sift the ashes.

3. In an ash sifter, a casing, a shaft journaled in the casing, a rectangular guide fixed to rotate with the shaft and having its upper side open, said guide having openings therein, a reticulated sheet having its edges secured to the upper edges of the guide and of circular formation, end plates secured to the ends of the sheet, parallel beams secured to the end plates supporting the reticulated sheet, a pan mounted in the guide substantially outwardly of the arc of the circle of the sheet, a handle fixed to the shaft for rotating the same, the reticulated sheet being adapted to be disposed downwardly and the ash pan rotated.

4. In an ash sifter, a casing, a pan mounted in the bottom thereof, angularly disposed plates mounted upon opposite sides of the casing and above the pan, a shaft rotatable in the casing, an ash pan rotatable with the shaft, a bowed reticulated sheet disposed above the ash pan and secured thereto, the bowed sheet being adapted to be disposed downwardly when the ash pan rocks backward and forward to sift the ashes.

5. An ash sifter comprising a casing, a screen substantially cylindrical in formation rotatably mounted in said casing at the ends thereof, means for rotating said screen, said screen having an open side, a guide carried by said side having an opening communicating with the interior of the screen, said guide having openings in the side portions thereof near the bottom, a pan tapering in width and fitted in said guide, said guide having a closed end and an open end through which said pan may be placed in or removed from the guide, and a pan insertible beneath said screen and parts associated therewith.

In testimony that we claim the foregoing as our own, we have hereto affixed our signatures in the presence of two witnesses.

FREDRICK ZIEMER.
CHARLES BRAUN.

Witnesses:
HARRY N. HOTCHKISS,
JOSEPH J. HAVRILLA.